United States Patent [19]
Alt et al.

[11] Patent Number: 5,400,970
[45] Date of Patent: Mar. 28, 1995

[54] DEVICE FOR THE COMBINED BLOWOFF OF FUEL AND AIR

[75] Inventors: Norbert Alt, Remagen; Gunter Gürich, Aachen; Michael Hüser, Aachen; Leo Spiegel, Aachen; Franz Pischinger, Aachen, all of Germany

[73] Assignee: FEV Motorentechnik GmbH & Co. KG, Aachen, Germany

[21] Appl. No.: 157,897

[22] Filed: Nov. 19, 1993

[30] Foreign Application Priority Data

Nov. 24, 1992 [DE] Germany .................. 42 39 280.2

[51] Int. Cl.6 .................................................. F23D 14/16
[52] U.S. Cl. ...................................... 239/408; 239/415; 239/416.4; 239/585.1
[58] Field of Search ............ 239/585.1, 585.5, 416, 239/415, 416.4, 416.5, 417, 533.7, 533.5, 408–410, 453, 452, 456; 251/129.19, 129.2, 129.21; 137/625.12, 628, 630.22

[56] References Cited

U.S. PATENT DOCUMENTS

| | | | |
|---|---|---|---|
| 1,393,090 | 10/1921 | Cowardin | 239/408 X |
| 1,411,108 | 3/1922 | Kasfler | 239/408 X |
| 2,049,141 | 7/1936 | Schwoiden | 239/450 |
| 4,834,291 | 5/1989 | Kollmann | 239/415 X |
| 4,958,771 | 9/1990 | Klomp | 239/533.2 X |
| 5,024,385 | 6/1991 | Olsen | 239/533.2 X |

FOREIGN PATENT DOCUMENTS

| | | | |
|---|---|---|---|
| 384473 | 8/1990 | European Pat. Off. | |
| 273497 | 11/1911 | Germany | |
| 830589 | 2/1952 | Germany | 239/533.7 |
| 3914636 | 11/1990 | Germany | |
| 5334015 | 3/1978 | Japan | 239/533.9 |

*Primary Examiner*—Andres Kashnikow
*Assistant Examiner*—Kevin Weldon
*Attorney, Agent, or Firm*—Collard & Roe

[57] ABSTRACT

A device for the combined blowoff of fuel and air for direct fuel injection systems in internal combustion engines. The device includes a housing having a fuel connection and an air connection as well as a blowoff aperture connected with both connections and closable by electromagnetically operable valves. A fuel valve is arranged behind an air valve, also opening toward said blowoff side of said blowoff aperture. Both valves are arranged concentrically relative to each other and capable of resting with their valve seats sealing against the housing.

3 Claims, 2 Drawing Sheets

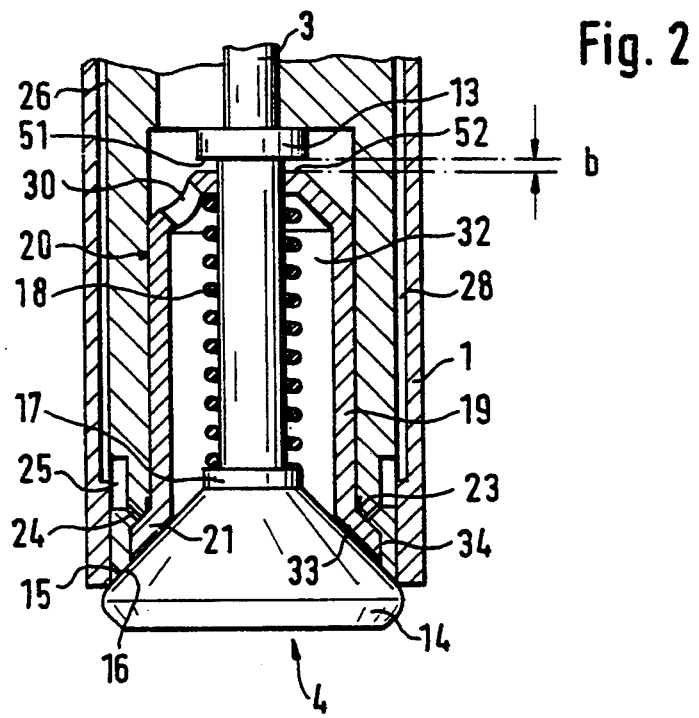
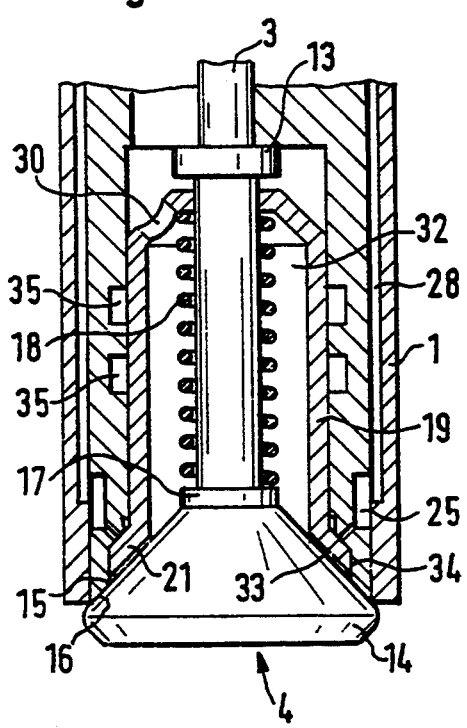
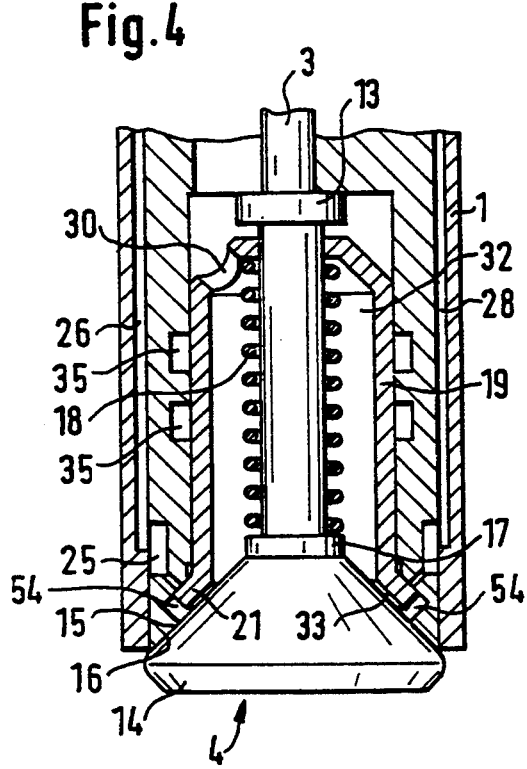

DEVICE FOR THE COMBINED BLOWOFF OF FUEL AND AIR

BACKGROUND OF THE INVENTION

1. Field of the Invention

The present invention relates to a device for the combined blowoff of fuel and air, in particular for direct fuel injection systems of internal combustion engines.

2. The Prior Art

A device for the combined blowoff of fuel and air is described in JP 2,185,664 (A). This known device has a fuel injection nozzle having the fuel valve and the air valve directed in opposite directions. Consequently, actuation with one single electromagnet is not possible in this known device. This leads to a considerable expenditure in terms of construction, space and control in particular, for example, with multi-cylinder internal combustion engines. The two valves do in fact abut against the housing; however, the cleaning effect of the air feed line via the valve seats of the fuel valve is canceled because they open in opposite directions.

Another known injection nozzle, which is different from the present invention, is known from DE PS 273,497. In this device, both valves open inwardly. This arrangement is suitable only for internal combustion engines having very high air and fuel pressures, for example, diesel engines. With gasoline injection, such an arrangement requires an additional, extremely high, expenditure with relatively high controlling forces because the fuel valve is pressure-controlled and dependent on a pump. No provision is made here for any control with an electromagnet. Control of the air valve is otherwise accomplished mechanically by means of a cam disk.

Another device, which is also different from the invention, is known from DE 3,914,636 A1. Here, the valve body of an air valve, which is movable into the interior of a housing and which concentrically surrounds the fuel feed line, is seated on a valve surface on the blowoff aperture of the housing. The valve body of a centrally arranged fuel valve, which is facing the blowoff aperture and is outwardly movable, is seated on a sealing surface provided on the valve body of the air valve. The seats on the inner and outer sides of the valve body of the air valve are directly exposed to the heat of the combustion chamber adjoining the blowoff aperture. Thus, there is a risk that the valve seats are easily fouled by carbon accumulation or the like. Therefore, the known device is at best usable for suction tubes.

As opposed to what is stated in the published patent specification of DE 3,914,636 A1, such limited applicability ensues for another reason. Since the two valves are operable in different directions, the high pressure in the combustion chamber would cause the air valve to open when it should be closed. On the other hand, if the closing spring of the air valve were to be dimensioned sufficiently strongly, then the electromagnet, in turn, would have to have an extremely high force. Consequently, the electromagnet would have a size of such a magnitude that it would not be acceptable for reasons of space availability (i.e., in order to be capable of opening the valve without the joint action of the gas pressure).

Furthermore, the interdependent sealing between these two valves, which are actuated by a common electromagnet, and the air valve against the housing, requires a high degree of precision of a magnitude that could hardly be accomplished at high thermal stress, in addition to the high manufacturing cost of such components.

Another known device for the combined blowoff of fuel and air is described in EP 0,384,473 A1. Here, provision is made for an air valve, which is actuated by an electromagnet, at the end of a housing aperture on the blowoff side. The valve member of the air valve is seated on a valve seat of the housing. For this purpose, throttle bores are arranged in and perpendicular to the valve seat. These bores are connected with a fuel feed conduit, in which another electromagnetically actuated metering valve for the fuel feed is arranged (i.e., screwed to the housing of the device).

The known device is rather complicated because it has two metering valves with electromagnets that operate independently of each other. The valve seat is, again, unfavorably located directly on the combustion chamber, in particular, the throttle bores for the fuel, such that the valve seats can easily change or become fouled.

SUMMARY OF THE INVENTION

It is an object of the present invention to provide a device for the combined blowoff of fuel and air whereby the metering and atomizing of fuel and air is maximized.

It is another object of the present invention to provide a device for the combined blowoff of fuel and air whereby the risk of soiling of the valve seats is avoided.

It is a further object of the invention to provide a device for the combined blowoff of fuel and air whereby the risk of thermal overstressing of the valves is avoided.

It is a further object of the invention to provide a device for the combined blowoff of fuel and air having an electronically controllable operating means.

The advantages of the present invention include a highly space-saving construction, which leads to controlling members that can be easily controlled, and a valve arrangement which permits actuation with only one electromagnet per injection nozzle. In connection with a multi-cylinder engine, this means a considerable saving of construction and maintenance expenditure, as well as of controlling means. The easily controllable setting members permit a very precise metering of the media, i.e., the feeding and metering of fuel, without the need for additional setting members at low pressure, by means of electronic devices. A unique aspect of the invention for solving these problems is the arrangement of the two valves such that their valve members open toward the blowoff side which allows for the use of the pressure in the combustion chamber to close the valves.

Furthermore, by arranging the valves in the same direction, the valve seats in the housing can be operated in a simplified manner from only one side. This avoids manufacturing flaws due to rechucking. The valve seats of the fuel valve, which is arranged behind the air valve, are effectively kept clean by the airflow.

Since both valves close in the same direction, the device can be used both in the suction conduit and in the combustion chamber, because the pressure of the combustion chamber acts on both valves in the same manner and in the closing direction.

BRIEF DESCRIPTION OF THE DRAWINGS

Other objects and features of the present invention will become apparent from the following detailed description considered in connection with the accompanying drawings which discloses the embodiments of the present invention. It should be understood, however, that the drawings are designed for the purpose of illustration only and not as a definition of the limits of the invention.

In the drawings, wherein similar reference characters denote similar elements throughout the several views:

FIG. 2 is an enlarged view of portion A of the valve arrangement of FIG. 1;

FIG. 3 is second embodiment of portion A of the invention showing an enlarged view of the valve arrangement; and FIG. 4 is a third embodiment of portion A of the invention showing an enlarged view of the valve arrangement.

DETAILED DESCRIPTION OF PREFERRED EMBODIMENTS

Figure 1:
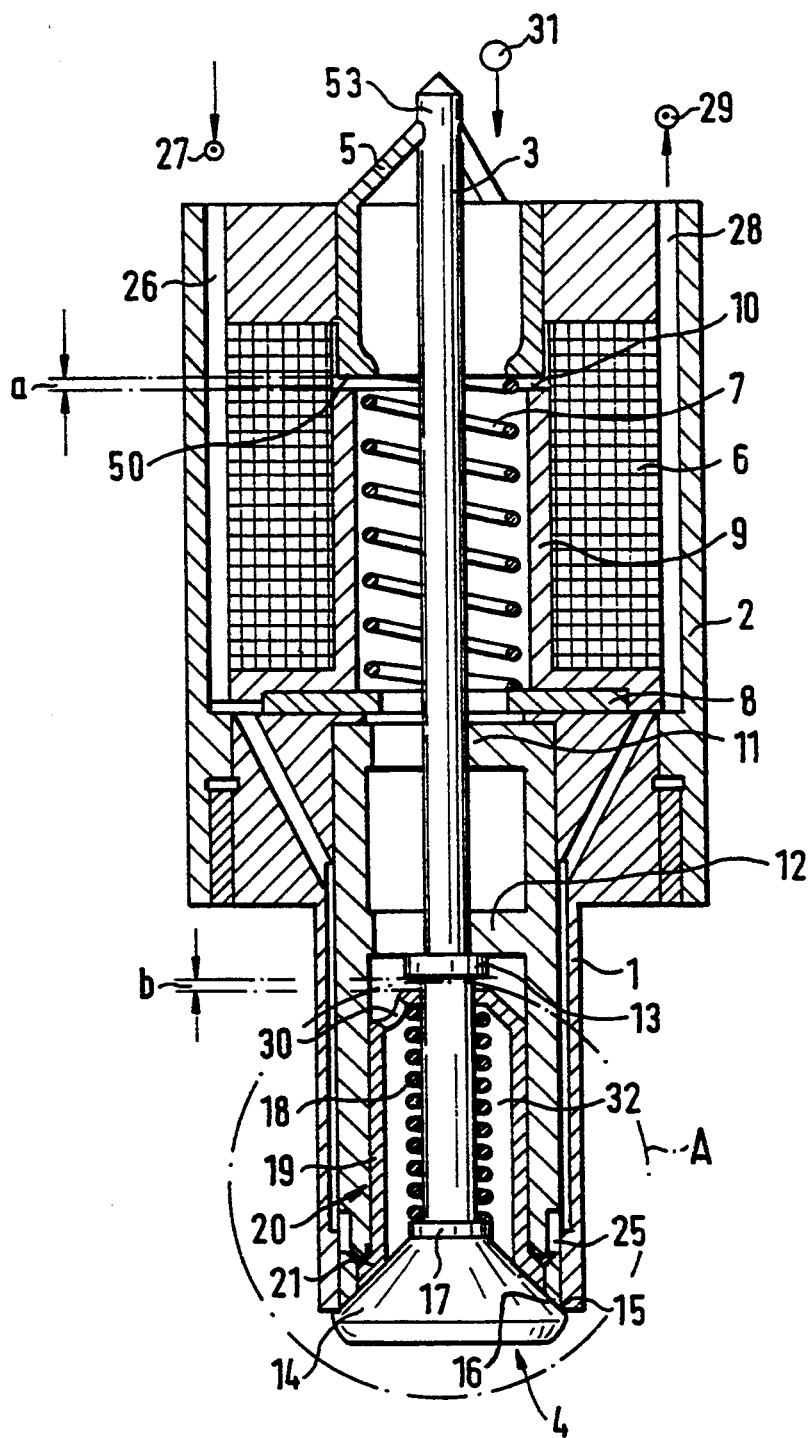
FIG. 1 is a longitudinal section view through a device according to the invention.

Turning now in detail to the drawings, FIG. 1 shows a longitudinal cross section of the device of the invention having a tubular housing 1 for the valves and a housing 2 for the valve drive. Housing 2 is placed on tubular housing 1. The shaft 3 of outer air valve 4 is axially and concentrically guided in housing 2. The upper end 53 of shaft 3 is connected by anchor 5 which concentrically surrounds shaft 3. Anchor 5 is displaceable within an annular electromagnet 6 located in housing 2. Anchor 5 is supported by resting against return spring 7, which rests on plate 8. Plate 8 is located between tubular housing 1 and a sleeve 9 within housing 2. Return spring 7 is surrounded by sleeve 9 which has an upper end 10. In the resting condition of electromagnet 6, (i.e., with the valves closed) a space "a" between upper end 10 of sleeve 9 and lower face 50 of anchor 5, forms a stroke-limiting stop for anchor 5.

Tubular housing 1 has two guiding shoulders 11 and 12 axially spaced from each other along shaft 3. Upper guiding shoulder 11 and lower guiding shoulder 12 support shaft 3 of the air valve 4.

Referring to FIG. 2, a frusto-conical valve member 14 is arranged on the lower end of shaft 3. Outer sealing surface 15 is seated on valve seat 16 of tubular housing 1 and completely closes the entire blowoff aperture of the device.

A collar 17 on the upper end of valve member 14 supports pressure spring 18, on which rests a bell-like, hollow shaft 19 of fuel valve 20. Shaft 3 has a collar 13 carried beneath the lower guiding shoulder 12, and this collar acts as a support for shaft 19, when shaft 3 is moved toward the blowoff aperture. The top side 52 of shaft 19 has a spacing "b" from underside 51 of collar 13. Spacing "b" is slightly smaller than the aforementioned spacing "a."

The lower end of shaft 19 is valve member 21 and is conically expanded and rests against fuel valve seat 23 located in tubular housing 1. Within this zone, fuel valve seat 23 has a throttle bore 24 through tubular housing 1, and this bore is arranged approximately perpendicular to seat 23 and is connected with an annular fuel chamber 25 in tubular housing 1.

The total cross section of throttle bores 24 is preferably smaller than the smallest cross-sectional area in the other fuel stream. In particular, bore 24 is also smaller than the cross-sectional area of flow on fuel valve seat 23 when fuel valve 20 is open.

Fuel chamber 25 (FIG. 2) is connected with a fuel source 27 (FIG. 1) via fuel feed conduit 26 present in housings 1 and 2. Furthermore, fuel chamber 25 is connected with a fuel return tank 29 (FIG. 1) or the like via fuel return conduit 28. With valve member 21 closed, a continuous flushing and cooling of the device is assured. At the same time, the formation of bubbles is avoided and the valves are effectively cooled in connection with direct injection. This, in turn, assures a perfect rotation of the internal combustion engine particularly when running after a phase of high load.

The bell-like shaft 19, which is provided with an upper aperture 30, forms a feed chamber 32 for air that is conducted from a compressed air source 31 (FIG. 1) axially through anchor 5, sleeve 9 and tubular housing 1 and into feed chamber 32. There is a clearance between outer jacket surface 15 of valve body 14 and inner jacket surface 33 of fuel valve 20.

It is also possible to surround the aperture of each throttle bore 24 with an annular bead (not shown). This would reduce the required sealing area.

Referring to FIGS. 3 and 4, it is advantageous to make provision in tubular housing 1 on the circumference of shaft 19 for at least one annular groove 35, which helps to avoid or to brake the leakage flow of air and/or fuel.

Referring to FIG. 4, the conically expanded ends of valve member 21 are shortened thereby leaving an aperture 54. This arrangement causes fuel to creep as fuel film along the walls of aperture 54 and to be removed by the air flow instead of being sprayed into said air flow.

During operation, electromagnet 6 is excited in cycles. In this connection, anchor 5 is pulled down by the measure "a" which causes valve body 14 of air valve 4 to lift itself simultaneously from its valve seat 16 downwardly.

As soon as the stroke of valve shaft 3, of air valve 4, exceeds a distance equal to spacing "b" shaft 19 of fuel valve 20 is moved after the intended time delay as well, and fuel valve 20 is opened, so that the released fuel is pulled along by the air flow and is atomized. Simultaneously, the stream of air released before, which is still effective even after fuel valve 20 is closed, cools and cleans valve seat 16.

While several embodiments of the present invention have been shown and described, it is to be understood that many changes and modifications may be made thereunto without departing from the spirit and scope of the invention as defined in the appended claims.

What is claimed is:

1. A device for the combined blowoff of fuel from a fuel source and air from an air source comprising:
   a housing having a fuel valve seat, an air valve seat and a blowoff aperture, said blowoff aperture coupled to the air source and the fuel source;
   an air valve axially disposed within said blowoff aperture, said air valve opening toward said blowoff aperture;
   a spring coupled to said air valve;
   behind said air valve a fuel valve, also opening toward said blowoff aperture and being supported on said air valve by said spring, said fuel valve and said air valve arranged concentrically relative to each other, said air valve and said fuel valve capable of resting with said valve seats sealing against said housing, said spring biasing said fuel valve into a closed position, said fuel valve disposed such that said fuel valve opens only after an initial opening stroke of said air valve, said fuel valve closing before said air valve closes; and one common electromagnet for actuating said fuel valve and said air valve, said electromagnet adapted for sequentially opening said air valve and subsequently overcoming the biasing force of said spring to open said fuel valve.

2. The device of claim 1 wherein said housing further comprises a fuel feed conduit, a fuel return conduit, an annular fuel chamber and at least one calibrated throttle bore, said fuel feed conduit feeds fuel into said annular fuel chamber, said annular fuel chamber connected to said at least one calibrated throttle bore, said at least one calibrated throttle bore leading to said fuel valve seat of said fuel valve.

3. The device of claim 2 wherein said fuel return conduit is connected to said annular fuel chamber bore.

* * * * *